May 26, 1936. L. H. TUCKER Re. 19,990

COMBINED VEHICLE SIGNAL

Original Filed July 12, 1932 2 Sheets-Sheet 1

Inventor
L. H. Tucker
By Watson E. Coleman
Attorney

May 26, 1936. L. H. TUCKER Re. 19,990

COMBINED VEHICLE SIGNAL

Original Filed July 12, 1932 2 Sheets-Sheet 2

Inventor

L. H. Tucker

By Watson E. Coleman

Attorney

Reissued May 26, 1936

Re. 19,990

UNITED STATES PATENT OFFICE 19,990

COMBINED VEHICLE SIGNAL

Lawrence H. Tucker, Hapeville, Ga.

Original No. 1,976,047, dated October 9, 1934, Serial No. 622,147, July 12, 1932. Application for reissue January 28, 1936, Serial No. 61,243

7 Claims. (Cl. 177—327)

This invention relates to signal lamps for automobiles and other vehicles and particularly to a signal by which any turning movement of the car to the right or to the left may be indicated. One of the objects of the invention is to provide a signalling device of this character which will achieve a two-fold purpose, namely perform the usual and ordinary functions of a license plate illuminator, and constitute a signal and direction indicator, indicating any deviation in the course of the car either to the left or to the right.

A further object is to provide a signal of this character which will constitute not only a license plate illuminator and a direction indicator, but also a stop signal of a particularly novel character.

Other objects will appear in the course of the following description.

My invention is illustrated in the accompanying drawings, wherein:—

Figures 1, 2, 3, 8:
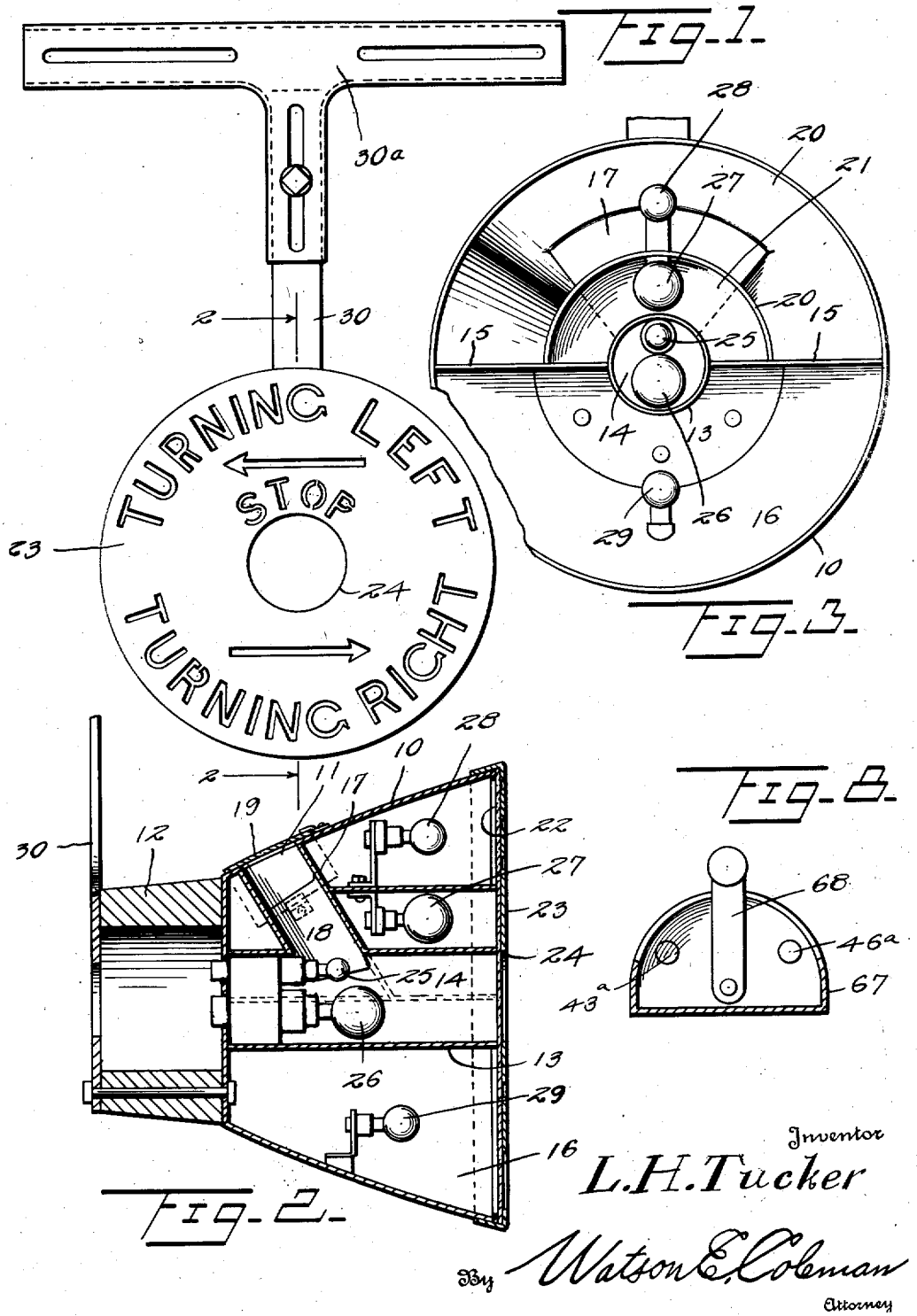
Figure 1 is an elevation of the signal casing constructed in accordance with my invention.
Figure 2 is a vertical section on the line 2—2 of Figure 1.
Figure 3 is a front elevation of the signal with the front plate removed.
Figure 8 is a fragmentary plan view of another form of switch, the casing being shown in section.

Referring to Figures 1, 2 and 3, it will be seen that the casing 10 of my signal is in the form of a frustrated cone having an opening 11 in its wall. This opening 11 may be directed either upward or downward but is shown as being directed upward so as to discharge light upon a license plate as will be later stated. Extending axially through the lamp from the base 12 thereof is a centrally disposed circular wall 13 defining a central lamp compartment 14. Extending radially from this wall 13 are the lateral horizontally extending walls 15, which with the casing and the wall 13, define a semi-annular compartment 16. Extending upward and rearward (or downward and rearward) from the wall 13 of the compartment 14 is a substantially arcuate wall 17 which defines a compartment 18 opening at its lower end into the central compartment 14 and at its upper end registering with the opening 11 in the wall of the signal casing 10. A transparent cover 19 of mica, celluloid or any other suitable material is held in place over this opening 11. The light from this opening is discharged upward against a license plate if the wall 17 is directed upward and rearward or downward against a license plate as desired.

Disposed concentrically to the wall 13, extending in a semi-circle is a wall 20 which defines a semi-annular compartment 21, the ends of which are closed by the walls 15. This compartment 21 extends rearward to the wall 17. Over the face of the casing 10 is disposed a celluloid or other transparent colored plate 22 and over this a face plate 23 which has at its upper portion the words "Turning left", at its lower portion the words "Turning right", at its center a circular opening 24, above this opening the word "Stop" cut out from the plate, above the word "Stop" an arrow pointing toward the left and above the words "Turning right" an arrow pointing to the right. These words "Turning left", "Turning right", "Stop" and the arrows are cut out from the plate so that when the compartments behind the plate are illuminated, these words will be observed.

For the purpose of illuminating the central compartment 14, I have provided a small three-candle power lamp 25. Also disposed within the compartment 14 is a fifteen candle power bulb 26. Disposed within the compartment 21, and, therefore, behind the word "Stop" is a lamp 27 which when energized will illuminate the word "Stop". Disposed within the compartment 20′ behind the words "Turning left" is a lamp 28 and disposed within the compartment 16 behind the words "Turning right" is a lamp 29. The lamp 25 is constantly energized at night to constitute a parking lamp and also to illuminate the license plate, the lamps 26 and 27 are both illuminated when the brake is put on to thus illuminate the central compartment and the opening 24 and also illuminate the word "Stop". The lamp 28 is energized when the machine is about to turn to the left, while the lamp 29 is energized when the machine is about to turn to the right.

The base of the casing is shown as mounted upon a vertical support 30 adjustably connected to a T-shaped bracket 30a forming part of the support whereby the direction signal may be connected to the license plate supporting bracket of the car in such position that the light from the opening 11 will be discharged upon the license plate. Access may be had to the several lamps by removing the outer plate 23 with its inner sheet or pane of red transparent material. The means whereby the several lamps may be energized is illustrated in Figures 4 to 7.

Figure 5:
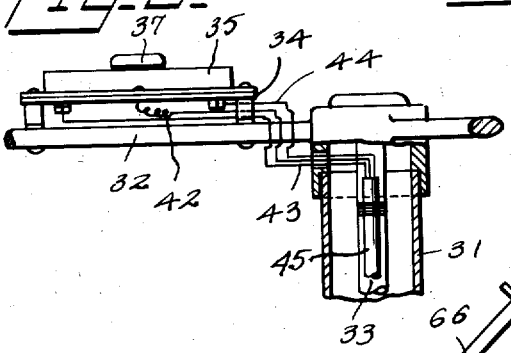
Figure 5 is a fragmentary section of the steering post showing a portion of the steering wheel and showing the switch mounted thereon.

In Figure 5, 31 designates the steering post of an automobile 32 the wheel thereon and 33 the steering shaft, the steering post being, of course, fixed in position. Mounted upon the wheel is a switch comprising a base 34, a casing 35 mounted upon the base and having a longitudinally extending slot 36. Mounted upon the casing 35 is a button 37 with a switch contact 38 disposed within the casing, the button having a link extending through the slot 36 and engaging the contact.

Figure 7:
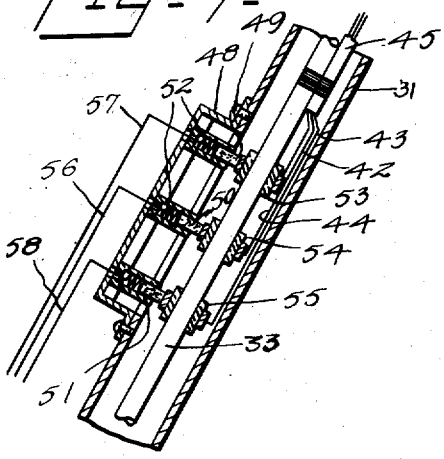
Figure 7 is a fragmentary longitudinal section of the steering post adjacent the base of the post and showing the contacts carried by the steering shaft, these contacts being shown in section.

Disposed within the casing are the two contacts 39 and 40 insulated and mounted upon binding screws 41. The casing is mounted upon the steering wheel in any suitable manner. The sliding contact 38 is connected by a wire 42 to a source of current. The contact 39 has connected to it the wire 43 and the contact 40 has connected to it the wire 44. These three wires extend down the steering post for rotation therewith and are, of course, suitably insulated as, for instance, by passing through a rubber tube 45 as shown in Figure 7.

Mounted upon the steering post at its lower end is a casing 48 within which are disposed three brushes 49, 50 and 51. These are urged by springs 52 inward. These brushes bear against three collector rings 53, 54 and 55 which are connected respectively to the wires 42, 43 and 44.

Figure 4:
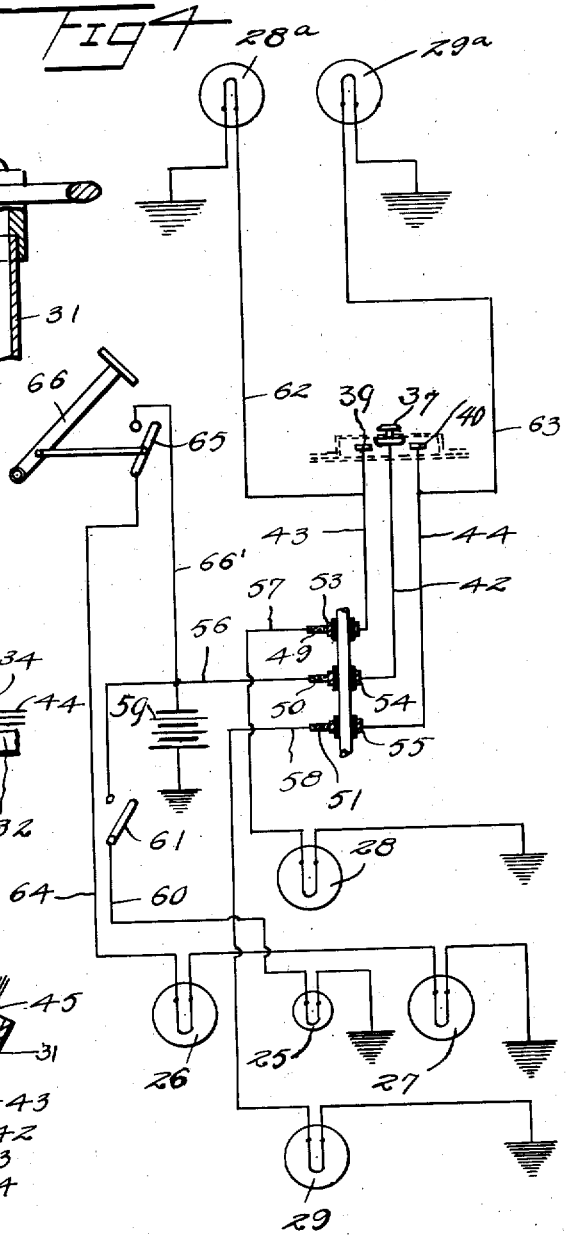
Figure 4 is an electrical diagram showing the connections from the switches to the several signal lamps of the automobile.

Leading from these three brushes are the wires 56, 57 and 58, the wire 56 leading to a battery 59, the wire 57 leading to the lamp 28 and to a ground, the wire 58 leading to the lamp 29 and to a ground. Thus when the switch button 37 is shifted to the left in Figure 4, the "Turning left" lamp 28 will be energized and when the button is shifted to the right in Figure 4, the lamp 29 illuminating the "Turning right" signal will be energized. The lamp 25 as disclosed in Figure 4 is connected on one side to the battery 59 by means of the wire 60 so that this lamp is constantly illuminated except when the switch 61 is thrown to an off position. Preferably, though not necessarily, a lamp 28a, and a lamp 29a indicating "right" and "left" movement of the car will be disposed at the front of the car, the lamp 28a being connected to the wire 43 by means of the wire 62 while the lamp 29a is connected by means of the wire 63 to the wire 44 so that when the lamp 28 is illuminated, the lamp 28a will be illuminated and when the lamp 29 is illuminated, the lamp 29a will be illuminated. For the purpose of energizing the stop signal when the brake is applied, I connect the lamps 26 and 27 in a circuit with a brake actuated switch and the battery by means of the conducting wire 64, which extends to a switch 65 operatively connected to the brake pedal 66 so that when this brake pedal is operated, the switch 65 will connect with a conductor 66' leading to the battery 59.

It is to be understood that during the day, the lamp 26 will be energized whenever the brake is applied to thus provide a stop light signal and this is also true of the lamp 27 which will illuminate the word "Stop" both day and night. At night, however, the switch 61 is turned to a closed position which energizes the lamp 25 which thus constitutes a tail light and a license plate illuminator but when the brake is applied to stop, this central light brightens to eighteen candle power and at the same time the word "Stop" is illuminated by the fifteen candle power lamp 27.

I thus provide for a constant illumination of the parking light or lamp 25, for an illumination of the stop signal lamps 26 and 27 when the brake is shifted to a braking position, and a selective illumination of the "Turning left" or "Turning right" signal by means of the switch button 37 mounted upon the steering wheel of the car. It will be understood, however, that this button might be mounted in another place without any departure from the spirit of the invention.

Figure 6:
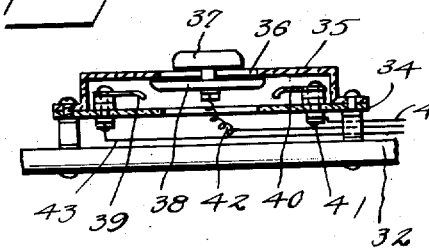
Figure 6 is a longitudinal section of the switch, a portion of the steering wheel being shown in elevation.

In Figure 8 I have illustrated another form of switch than that shown in Figure 6 in which the two contacts 43a and 46a are disposed within a casing 67, there being a switch lever 68 mounted within the casing and operating through an arcuate slot and shiftable to engage the contact 43a or 46a, this switch lever being connected to the source of current.

I have illustrated in the drawings a signal wherein the central compartment is provided with a tail light bulb or lamp and a stop light lamp and wherein there is also provided a stop lamp compartment with the word "Stop" adapted to be illuminated when the lamp in this compartment is energized, yet I wish it distinctly understood that under some circumstances I desire that only a tail light bulb (three candle power, for instance) shall be disposed within the central compartment and the stopping of the machine shall be indicated by the illumination of the word "Stop" without any additional illumination of the central compartment and the central opening through the face plate.

It will be seen that I have provided an accessory which is particularly compact and by which four functions are secured, namely the provision of a tail light, the constant illumination of the license plate, this illumination causing the entire length of the license plate to be lighted up instead of a fraction thereof, permitting a stop signal to be illuminated upon the application of the brake, and providing for the illumination of either a turning left or turning right signal. All of these several signals are enclosed in a compact casing which may be readily applied and which may be readily taken apart.

I claim:—

1. A signal comprising a casing; a central partition extending from the front of the casing to the rear thereof, said partition being tubular to provide a central compartment; transverse partitions extending from the wall of the casing to the partition and dividing the casing into two semi-annular compartments; a partition concentric to the central compartment and extending through one of the semi-annular compartments to the transverse partitions and defining a compartment between the central compartment and the outer wall of the casing; a partition defining a duct radial to the central compartment; and opening at one end thereinto and at its other end through the wall of the casing, said duct sloping so as to throw light upon the face of a license plate disposed on a plane to the rear and side of said casing; means for supporting a lamp bulb in each of the compartments; and means registering with the front of said compartments providing a right and a left turn direction signal cooperating with the respective semi-annular compartments, a stop signal for the said concentric compartment, and a central clear signal cooperating with the said central tubular compartment to normally serve as a tail light.

2. A signal comprising a casing, a central partition extending from the front of the casing to the rear thereof, said partition formed to provide a central compartment, partitions extending from the wall of the casing to the central compartment and separating the casing into two main compartments, a partition in one of the main compartments and formed to provide an auxiliary compartment between the central compartment and the outer wall of the casing, said central compartment having a communicating partition extending radially and rearwardly therefrom to the outer wall of the casing to provide an inclined passage for projecting the light from the central compartment rearwardly of the casing, lamp bulbs mounted in each of said compartments, a facing plate connected to the front end of the casing and having an opening registering with the central compartment to provide a clear signal, said plate having indicia registering with the main compartments and cooperating therewith to provide a right and left turn direction signal, and indicia on the plate registering with the auxiliary compartment to provide a stop signal.

3. A vehicle direction signal including a casing having a partition extending from the front of the casing to the rear thereof and formed to provide a central compartment, transverse partitions extending outwardly from opposite sides of the central compartment to the wall of the casing to form two separate main compartments, a partition in one of the main compartments and extending to the transverse partitions to provide an auxiliary compartment between the central compartment and the outer wall of the casing, said central compartment having an arcuate wall extending radially and rearwardly therefrom to the outer wall of the casing so as to form an inclined passage for projecting light outwardly and rearwardly from the central compartment, a lamp bulb mounted in each of said compartments, and a face plate connected to the front end of the casing and having an opening registering with the central compartment to provide a clear signal, said plate having suitable indicia selectively registering with the compartments and cooperating therewith whereby upon the lighting of the bulb in any one of the compartments to give a proper warning signal.

4. A vehicle direction signal including a casing having a partition extending from the front of the casing to the rear thereof and formed to provide a central compartment, transverse partitions extending outwardly from opposite sides of the central compartment to the wall of the casing to form two separate main compartments, a partition in one of the main compartments and extending to the transverse partitions to provide an auxiliary compartment between the central compartment and the outer wall of the casing, said central compartment having an arcuate wall extending radially and rearwardly therefrom to the outer wall of the casing so as to form an inclined passage for projecting light outwardly and rearwardly from the central compartment, a lamp bulb mounted in each of said compartments, the bulb in the central compartment being disposed substantially at the intersection of the axes of the central compartment and the inclined passage, and a face plate connected to the front end of the casing and having an opening registering with the central compartment to provide a clear signal, said plate having suitable indicia selectively registering with the compartments and cooperating therewith whereby upon the lighting of the bulb in any one of the compartments to give a proper warning signal.

5. A vehicle direction signal including a casing, said casing having a partition extending from the front to its rear and formed to provide a central compartment, transverse partitions extending outwardly from opposite sides of the central compartment to the wall of the casing to form two separate main compartments, a partition in one of the main compartments formed so as to extend to the transverse partitions to provide an auxiliary compartment between the central compartment and the outer wall of the casing, an arcuate wall extending radially and rearwardly from the central compartment to the outer wall of the casing and through the auxiliary compartment to provide an inclined passage to project the light from the central compartment, a lamp bulb mounted in each of said compartments, and a facing plate connected to the front end of the casing and having an opening registering with the central compartment to provide a clear signal, said plate having suitable indicia selectively registering with the compartments and cooperating therewith whereby upon the lighting of the bulb in any one of the compartments to give a proper warning signal.

6. An electric signal system for vehicles including a casing having an opening in its side wall, said casing being provided with a central compartment and a plurality of separate compartments formed between the central compartment and the outer wall of the casing, a wall extending radially and rearwardly from the central compartment to the opening in the casing to form a rearwardly inclined light transmitting passage, a face plate closing said compartments and having independent signal indicia thereon each registering with an independent compartment, light means of variable intensity associated with the central compartment and the radial passage, means for varying the intensity of said last-mentioned light means, a light in one of the compartments for indicating the turning of the vehicle to the right, a light in another compartment indicating the turning of the vehicle to the left, and means for selectively energizing the right and left turn lights in accordance with the change in the forward direction of the vehicle.

7. An electric signal system for vehicles including a casing having an opening in its side wall, said casing being provided with a central compartment and a plurality of separate compartments formed between the central compartment and the outer wall of the casing, a wall extending radially and rearwardly from the central compartment to the opening in the casing to form a rearwardly inclined light transmitting passage, a face plate closing said compartments and having independent signal indicia including direction indicia each registering with an independent compartment, light bulbs in each of said compartments and said passage, means for constantly energizing the bulb in said passage to constitute a tail light, the bulb in the central compartment being disposed substantially at the intersection of the axes of the central compartment and the radial passage, means for energizing two of the adjacent bulbs to provide a stop signal, one of the stop signal bulbs being associated with the bulb in said passage to increase the intensity of illumination of the central compartment, a light in one of the compartments for indicating the turning of vehicles to the right and a light in another compartment indicating the turning of the vehicle to the left, and means for selectively energizing the right and left turn lights in accordance with the change in the forward direction of the vehicle.

LAWRENCE H. TUCKER.